United States Patent

[11] 3,610,534

| [72] | Inventors | George E. Medawar<br>San Diego;<br>Harold E. Nelson, Jr., Chula Vista, both of Calif. |
|------|-----------|---|
| [21] | Appl. No. | 886,248 |
| [22] | Filed     | Dec. 18, 1969 |
| [45] | Patented  | Oct. 5, 1971 |
| [73] | Assignee  | Rohr Corporation<br>Chula Vista, Calif. |

[54] THRUST-REVERSING APPARATUS FOR JET-PROPELLED AIRCRAFT
5 Claims, 6 Drawing Figs.

[52] U.S. Cl. ............................................. 239/265.29,
239/265.37
[51] Int. Cl. ............................................. B64c 15/04
[50] Field of Search ............................................. 239/265.11,
265.29, 265.33, 265.37; 60/232

[56] References Cited
UNITED STATES PATENTS

| 2,968,150 | 1/1961 | Goebel et al. | 239/265.37 |
| 3,261,165 | 7/1966 | Smith | 239/265.29 |

*Primary Examiner*—Lloyd L. King
*Attorney*—George E. Pearson

ABSTRACT: Each of a pair of thrust-reversing doors is mounted on an aircraft jet engine housing by means of four links, two of which are rotatable by gear drive mechanisms located at the points of connection of the links to the housing.

PATENTED OCT 5 1971

INVENTOR.
GEORGE E. MEDAWAR
HAROLD E. NELSON, JR.

BY *Edwin D. Grant*
ATTORNEY

INVENTOR.
GEORGE E. MEDAWAR
HAROLD E. NELSON, JR.

BY *Edwin D. Grant*
ATTORNEY

THRUST-REVERSING APPARATUS FOR JET-PROPELLED AIRCRAFT

SUMMARY OF THE INVENTION

This invention relates to jet-propelled aircraft and, more particularly, to thrust-reversing apparatus for such aircraft.

In many jet-propelled airplanes reversal of thrust of a jet engine is effected by mounting a pair of arcuate panels, or doors, on the housing of said engine so that they can either be stowed in a streamlined configuration thereon or deployed to a position wherein they intercept exhaust gas discharged from the engine and deflect the same both laterally and forwardly relative to said housing. Heretofore such thrust-reversing doors have often been mounted on an engine housing by means of a so-called "four-bar" linkage arrangement in which two support links are pivoted to each side of a door and to the housing, and a drive link is connected to one link of this pair of support links and to an actuator, such as a hydraulic jack, mounted on the housing. Operation of the actuators associated with such a system moves the drive links longitudinally of the engine housing and thereby swings the support links and doors about their pivot points on the latter to either the stowed or deployed position.

Apparatus in accordance with the present invention also utilizes four links to pivotally connect each of an associated pair of thrust-reversing doors to walls which extend from the aft end of a jet engine housing. However, two of the four links which support each thrust-reversing door in the different embodiments of this invention are rotatable by gear drive means located at the points where the pair of links attach to the aforesaid walls, and there are no drive links as in the case of conventional four-bar thrust-reversing systems. More specifically, in one preferred from of the invention each of a pair of arcuate doors is mounted on elongate walls which are attached in parallel, diametrically opposed relation to the aft end of a tubular jet engine housing and which extend rearwardly therefrom. The doors are formed so that they can be disposed on opposite sides of the aforesaid walls with their side edges respectively abutting the longitudinal edges of the walls and their forward edges abutting the aft edge of the housing. Pivoted to the aft end of each wall are two links which for identification will hereinafter be referred to as the first links. Each of the four first links is also pivoted to a respective one of the doors adjacent the aft end of a respective one of the side edges thereof. A pair of gearboxes are also mounted on each wall at points spaced apart transversely thereof and located forward of the points of connection of the first links thereto. Each gearbox assembly comprises a rotatable arm which for identification is referred to hereinafter as a second link and the free end of which is pivoted to a respective one of the doors adjacent the forward end of a respective one of the side edges thereof. A torque motor is mounted on each wall and connected by suitable shafts and gearing to the two gearboxes on the same wall, and the torque motors are simultaneously operable to rotate the first links about their respective points of connection to the gearboxes. Thus the doors can be swung between the aforedescribed stowed position and a deployed position wherein they abut each other downstream from the supporting walls and intercept exhaust gas discharged from the engine within the housing. In another preferred form of the invention each of a pair of arcuate doors is also pivotally connected by means of four links to a pair of walls projecting in parallel relation from the aft end of an engine housing, and two of these links are rotatable by gear drive means located at the points where the latter links attach to said walls. However, the second embodiment differs from the first in that the drive links thereof rotate about a common axis.

DETAILED DESCRIPTION

Figure 1:
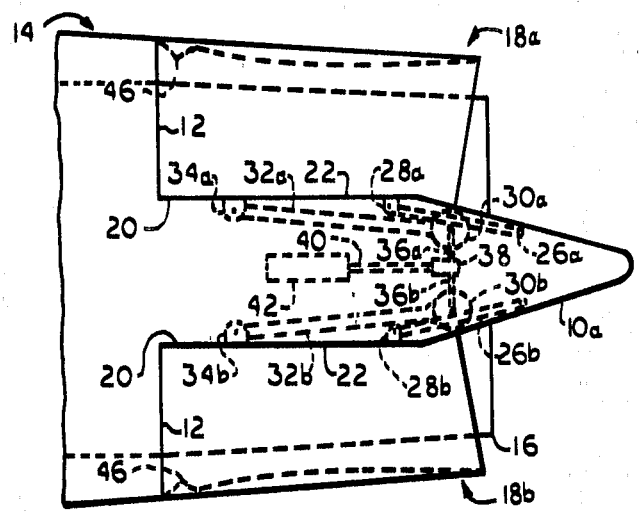
FIG. 1 is a side elevation of the aft end of an aircraft jet engine housing provided with thrust-reversing apparatus in accordance with a first embodiment of this invention, the drawing illustrating the retracted configuration of components of said apparatus.
Figure 2:
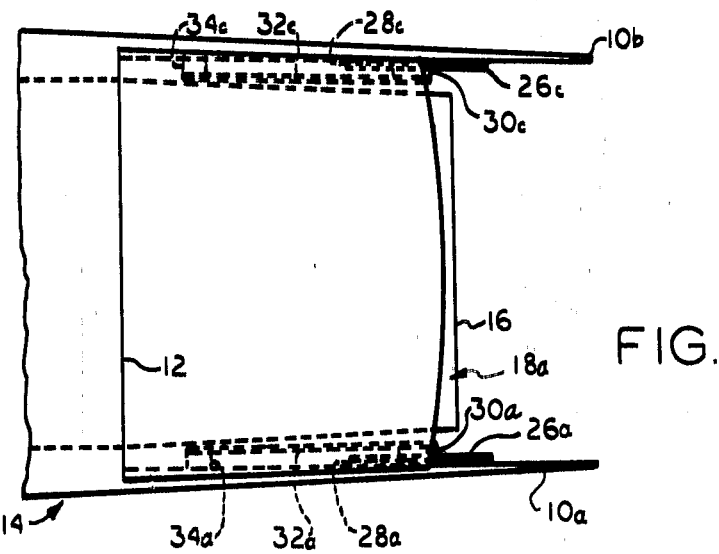
FIG. 2 is a plan view of the same housing and thrust-reversing apparatus.
Figure 3:
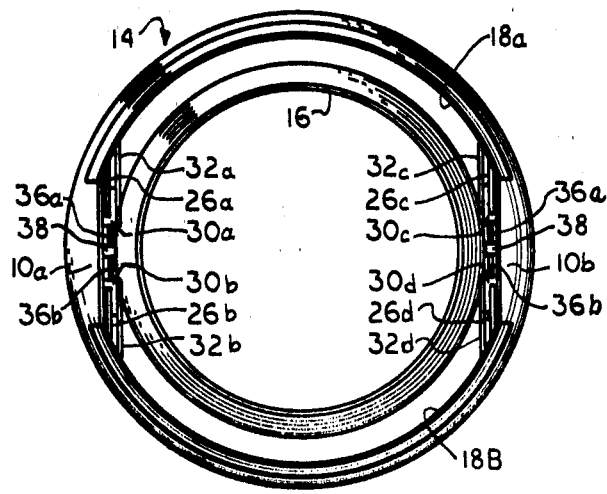
FIG. 3 is a rear elevation of the same embodiment.

In the embodiment of the invention illustrated in FIGS. 1–4, a pair of elongate sidewalls 10a, 10b are fixedly attached to, and project rearwardly from, the aft edge 12 of a tubular housing which is generally designated 14 and which may be either an aircraft jet engine nacelle or an aircraft fuselage enclosing a jet engine. As can be seen in FIG. 2, the sidewalls are mounted in diametrically opposed, substantially parallel relation on housing 14, and the thrust nozzle 16 of the jet engine is positioned therebetween. Both FIG. 1 and FIG. 2 illustrate the stowed position of a pair of arcuate thrust reversing doors 18a, 18b, i.e., a position wherein the side edges 20 of the doors are respectively disposed alongside the longitudinal edges 22 of walls 10a, 10b and the forward edges 24 of said doors are respectively disposed alongside the upper and lower segments of the aft edge 14 of housing 14.

Pivotally mounted on the inner surface of each wall 10a, 10b adjacent the aft end thereof are two links 26a–26d which for convenience of identification will be referred to hereinafter as the first links. More particularly, first links 26a and 26c are respectively connected at one end to sidewalls 10a, 10b for rotation about a first axis disposed transverse to the longitudinal axis of housing 14, and first links 26b and 26d are respectively connected at one end to the sidewalls for rotation about a second axis which is also transverse to the longitudinal axis of the housing and parallel with the first axis. The free ends of first links 26a and 26c (i.e., the ends of said links not connected to the sidewalls) are respectively pivoted to lugs 28a, 28c (see FIG. 2) mounted on the side edges of door 18a adjacent the aft end thereof, while the free ends of first links 26b and 26d are respectively pivoted to lugs 28b, 28d on the side edges of door 18b adjacent the aft end thereof, the axes of rotation of the doors relative to the first links being parallel to the axes of rotation of the first links relative to the sidewalls. Two gear boxes 30a–30d are fixed in position on each sidewall 10a, 10b at points spaced apart transversely thereon and located forward of the points of attachment of the first links to the sidewall, said gearboxes preferably being of the type sold by Curtiss Division of Curtiss-Wright Corporation under their trademark "Power Hinge" and each comprising a rotatable arm, or second link, 32a–32d. More specifically, the uppermost second link 32a on sidewall 10a and the uppermost second link 32c (see FIGS. 2 and 3) on sidewall 10b are respectively connected to gear boxes 30a and 30c for rotation about an axis transverse to the longitudinal axis of housing 14 and parallel to the axes of rotation of first links 26 relative to said sidewalls. Similarly, the lowermost second link 32b on sidewall 10a and the lowermost second link 32d on sidewall 10b are respectively connected to gearboxes 30b and 30d for rotation about an axis which is also transverse to the longitudinal axis of the housing and parallel to the axes of rotation of first links 26 and second links 32a, 32c relative to the sidewalls. The free ends of second links 32a and 32c are respectively pivoted to lugs 32a, 34c mounted on the side edges of door 18a adjacent the forward end thereof, and the free ends of second links 32b, 32d are respectively pivoted to lugs 34b, 34d mounted on the side edges of door 18b adjacent the forward end thereof, the axes of rotation of the doors relative to the second links being parallel to the axes of rotation of the first and second links relative to the sidewalls.

The two gear boxes 30a–30d on each sidewall 10a, 10b are connected by shafts 36a, 36b to a right angle drive mechanism 38 which in turn is connected by a shaft 40 to a drive motor 42, the drive mechanisms and motors being fastened to the respective sidewalls by suitable means and being operable at any selected time to rotate the pair of second links 32a, 32b or 32c, 32d associated therewith in the same direction e.g., when second link 32a is rotated clockwise as viewed in FIG. 1, second link 32b is rotated counterclockwise so that the free ends of said links are swung outwardly from sidewall 10a and in the downstream direction).

Figure 4:
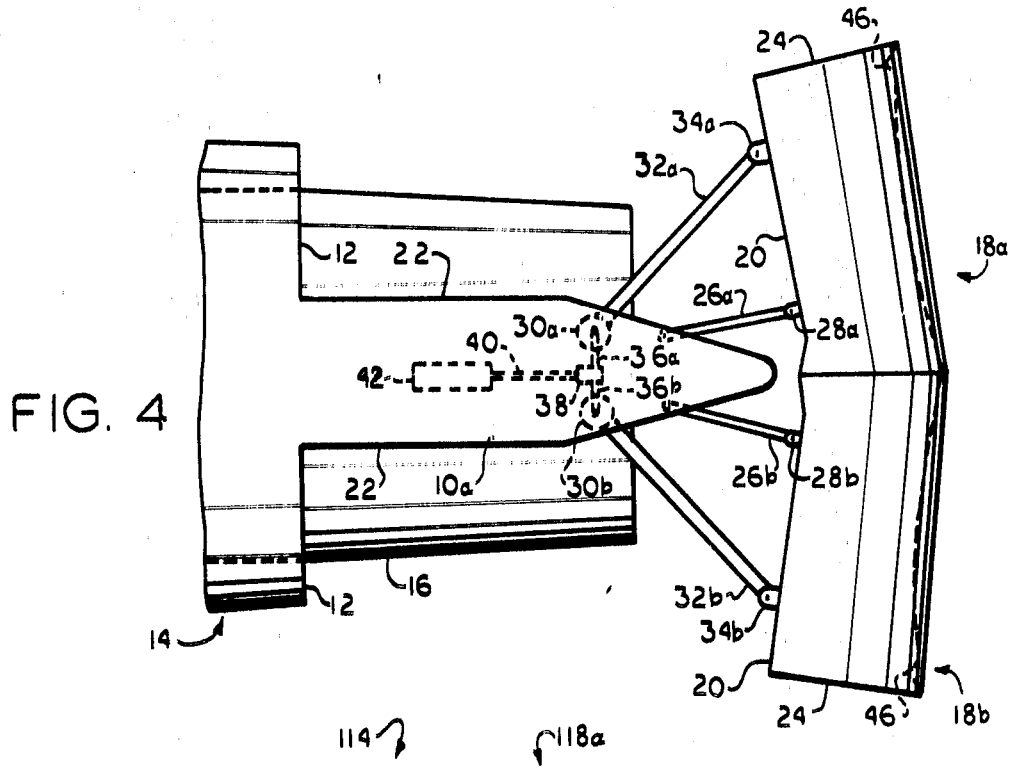
FIG. 4 is another side elevation of the aft end of the engine housing shown in FIG. 1, illustrating the deployed configuration of components of the thrust-reversing apparatus.
Figure 5:
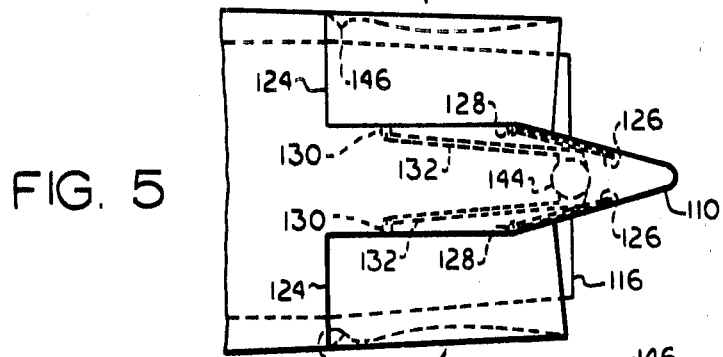
FIG. 5 is a side elevation of the aft end of an aircraft jet engine housing provided with thrust-reversing apparatus in accordance with a second embodiment of the invention, the drawing illustrating the retracted configuration of components of said apparatus.
Figure 6:
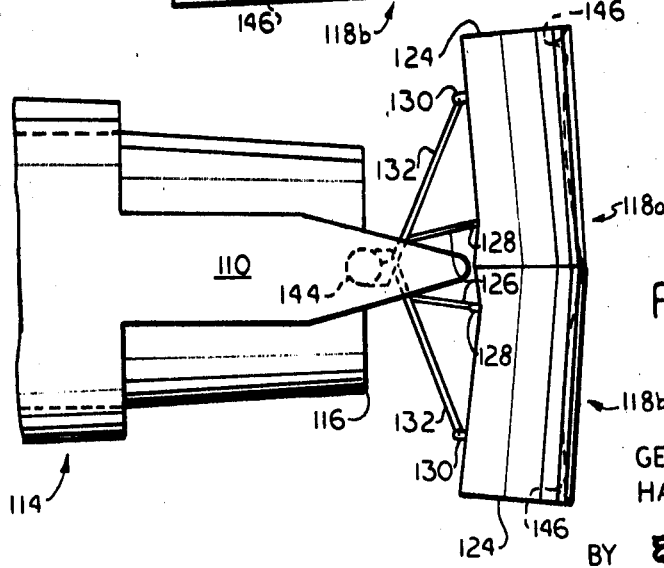
FIG. 6 is another side elevation of the aft end of the engine housing shown in FIG. 5 illustrating the deployed configuration of components of the thrust-reversing apparatus.

FIGS. 5 and 6 illustrate a second embodiment of the invention comprising a tubular jet engine housing 114, a thrust nozzle 116 extending from the aft end of said housing, a pair of sidewalls 110 (only one of which is illustrated) mounted on the aft end of said housing and extending rearwardly therefrom on opposite sides of said nozzle, a pair of thrust-reversing doors 118a, 118b having lugs 128, 130 attached to each side edge thereof, and four first links 126 pairs of which are respectively pivoted at one end to the inner surfaces of said sidewalls adjacent the aft ends thereof and respectively pivoted at the other end to the rearmost lugs 128 on the side edges of said doors. The aforesaid components of the second embodiment correspond in arrangement and function to the housing 14, nozzle 116, walls 10, lugs 28 and 34 and first links 26 of the apparatus illustrated in FIGS. 1–4. However, in the second embodiment four second links 132 (only two of which are illustrated) are respectively mounted in pairs on the sidewalls 110 for rotation about a common axis which is disposed parallel to the axes of rotation of first links 126 relative to said sidewalls and which intersects the longitudinal axis of housing 114. More particularly, the two second links 132 on each sidewall are the rotatable arms of a drive mechanism 144 which is mounted on the sidewall forward of the points where the pair of first links 126 are connected thereto, each drive mechanism being provided with a drive motor (not shown) which can be operated to swing its arms, or second links, between the position illustrated in FIG. 5 to the position illustrated in FIG. 6. A suitable drive mechanism for this purpose is sold by the Curtiss Division of the Curtiss-Wright Corporation under the aforesaid trademark "Power Hinge." The associated pairs of second links 132 are respectively located adjacent the inner surfaces of sidewalls 110 and forward of the points where the pairs of first links 126 are connected thereto. As in the case of the second links 32 of the first described embodiment, the free ends of second links 132 are respectively pivoted to the lugs 130 at the forward ends of the side edges of doors 118a, 118b, and the axis of rotation of each door relative to the second links connected thereto is parallel to the common axis of rotation of the second links relative to the sidewalls.

As illustrated in FIGS. 4 and 6, when the pairs of doors 18a, 18b and 118a, 118b of the two embodiments of the invention are deployed by the operation of the drive means associated with second links 32 and 132, respectively, their aft edges abut at the longitudinal axis of the housing 14, 114 on which the doors are carried. Exhaust gas streams of the engines within the housings then impinge upon the doors and are deflected outwardly toward the forward edges 24, 124 thereof, thus reversing the thrust of said engines. The aft edges of the doors of each embodiment are oblique to the side edges thereof, so that when the doors are in the deployed position they are inclined toward the forward end of the supporting housing 14, 114. To provide greater deflection of exhaust gas in the forward direction, the doors of the two embodiments are preferably formed with lips 46, 146, respectively, which extend circumferentially along their inner surfaces adjacent the forward ends thereof.

Although this invention has been described with reference to a particular embodiment of same, it should not be limited thereto for various changes and modifications could be made by one having ordinary skill in the art without departing from the spirit and scope of this invention as defined in the following claims.

What is claimed as new and useful and desired to be secured by U.S. Letters Patent is:

1. In combination with an aircraft jet engine housing, thrust-reversing apparatus comprising two walls attached in diametrically opposed relation to, and extending rearwardly from, the aft end of said housing, two arcuate thrust-reversing doors the side edges of which are respectively disposed alongside the longitudinal edges of said walls when said doors are in a stowed position, four first links, two of which are respectively pivoted at one end to one of said doors adjacent the aft portion of the side edges thereof and respectively pivoted at the other end to said walls adjacent the aft end thereof, the other two first links being respectively pivoted at one end to the other door adjacent the aft portion of the side edges thereof and respectively pivoted at the other end to said walls adjacent the aft end thereof, four second links two of which are respectively pivoted at one end to one of said doors adjacent the forward portion of the side edges thereof and respectively pivoted at the other end to said walls at points forward of the points where said first links are connected thereto, the other two second links being respectively pivoted at one end to the other door adjacent the forward portion of the side edges thereof and respectively pivoted at the other end to said walls at points forward of the points where said first links are connected thereto, and drive means mounted on said walls and operatively connected to said second links at the points where the latter are pivoted to said walls, said drive means being adapted to swing said second links between a first position wherein they extend longitudinally of said walls and a second position wherein they extend laterally therefrom, whereby said doors can be moved between said stowed position and a deployed position wherein they are disposed transverse to the longitudinal axis of said housing and their aft edges abut each other.

2. Apparatus as defined in claim 1 wherein said second links rotate about a common axis at their points of connection to said walls.

3. Apparatus as defined in claim 1 wherein said drive means comprises a plurality of gearboxes, there being one of said boxes for each of said second links and each of said second links comprises a rotatable arm on its respective gearbox, said gearboxes being mounted on said walls.

4. Apparatus as defined in claim 3 and further comprising first and second motors mounted respectively on said walls, first driving connections between said first motor and the gearboxes mounted on its wall, and second driving connections between said second motor and the gearboxes mounted on its wall.

5. Apparatus as defined in claim 4, each of said first and second driving connections comprising an angle drive mechanism and shafts extending therefrom to its associated motor and gearboxes.